Dec. 18, 1934.  E. A. BESCHERER  1,985,011
TELETYPEWRITER APPARATUS
Filed July 12, 1933  2 Sheets-Sheet 1

INVENTOR
E. A. BESCHERER
BY J. W. Schmied
ATTORNEY

Dec. 18, 1934.　　　E. A. BESCHERER　　　1,985,011
TELETYPEWRITER APPARATUS
Filed July 12, 1933　　　2 Sheets-Sheet 2
FIG. 2
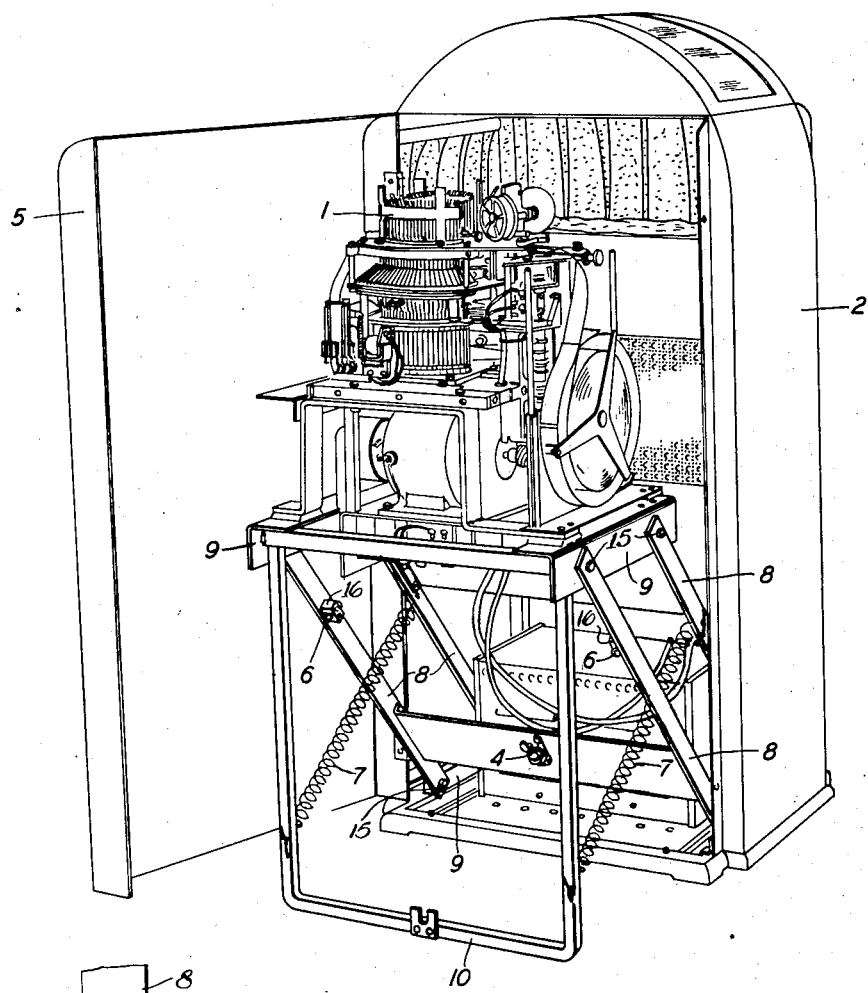
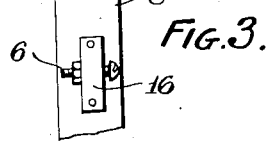
FIG. 3.
INVENTOR
E. A. BESCHERER
BY
J. W. Schmied
ATTORNEY Patented Dec. 18, 1934

1,985,011

UNITED STATES PATENT OFFICE 1,985,011

TELETYPEWRITER APPARATUS

Edwin A. Bescherer, Brooklyn, N. Y., assignor to Bell Telephone Laboratories, Incorporated, New York, N. Y., a corporation of New York Application July 12, 1933, Serial No. 680,027

1 Claim. (Cl. 312—27)

This invention relates to teletypewriters which are normally enclosed in individual cabinets and, more particularly, to an improved stand for supporting a teletypewriter inside its cabinet at a desired height.

Heretofore, teletypewriters have been supported upon a table or pedestal, such as those shown in Patent D-83,408 granted February 17, 1931 to J. A. Mahoney et al. and Patent D-87,286 granted June 28, 1932 to E. A. Bescherer et al. When a maintenance man wishes to repair or adjust a teletypewriter using one of the tables and covers shown in the above patents, it is necessary for him to remove the entire cover and to lay it aside somewhere, such as on the floor. In addition to being awkward and inconvenient, this procedure does not give him free access to the bottom part of the teletypewriter.

An object of this invention is to provide an improved stand for supporting a teletypewriter which is normally enclosed in an enclosure or a cabinet, this stand having both an operating and a maintenance position.

It is a further object of this invention to provide a stand having a plurality of positions for supporting apparatus, such as selecting relays, which must be moved from one level position to another.

This improved stand is preferably used for supporting teletypewriters which are enclosed in an enclosure or a cabinet, such as the cabinet shown in Patent D-90,278 granted to me on July 11, 1933. However, it is not to be restricted to teletypewriters which are enclosed in cabinets as it may also be used for supporting other types of teletypewriters, such as teletypewriters located at a switchboard panel. Furthermore, this stand may be used for supporting any apparatus which is desired to be shifted from one level position to another level position and vice versa. It is especially useful for supporting instrumentalities, such as selecting relays, which must be kept in level positions and which must occasionally be moved from one level position to another.

The value of this improved stand resides in the flexible parallelogram arrangement of a portion of its framework which enables the stand to be readily shifted from one position to another thereby simplifying matters for a maintenance man. If desired, holding means, such as a clamp and set-screws, may be provided for holding the stand securely in its operating position. To shift the stand from one position to another, it is necesary only to open the door of the cabinet, release the holding means, and then to manually pull the stand forward and outside the housing of the cabinet so as to rest upon the floor. To restore the stand to its operating position, the stand is manually lifted up and pushed back inside the housing of the cabinet, the holding means is fastened, and the door to the cabinet is shut.

The manner in which this flexible parallelogram framework guides and facilitates the shifting of the stand from its operating position to its maintenance position and vice versa will now be explained in detail with reference to the drawings in which:

Fig. 2 illustrates the improved stand in its maintenance position and supporting a teletypewriter outside of its cabinet in a position convenient for the purpose of being repaired and adjusted; and Fig. 3 illustrates the set-screws used for the purpose of fixing the exact operating position of the teletypewriter.

Figure 1:
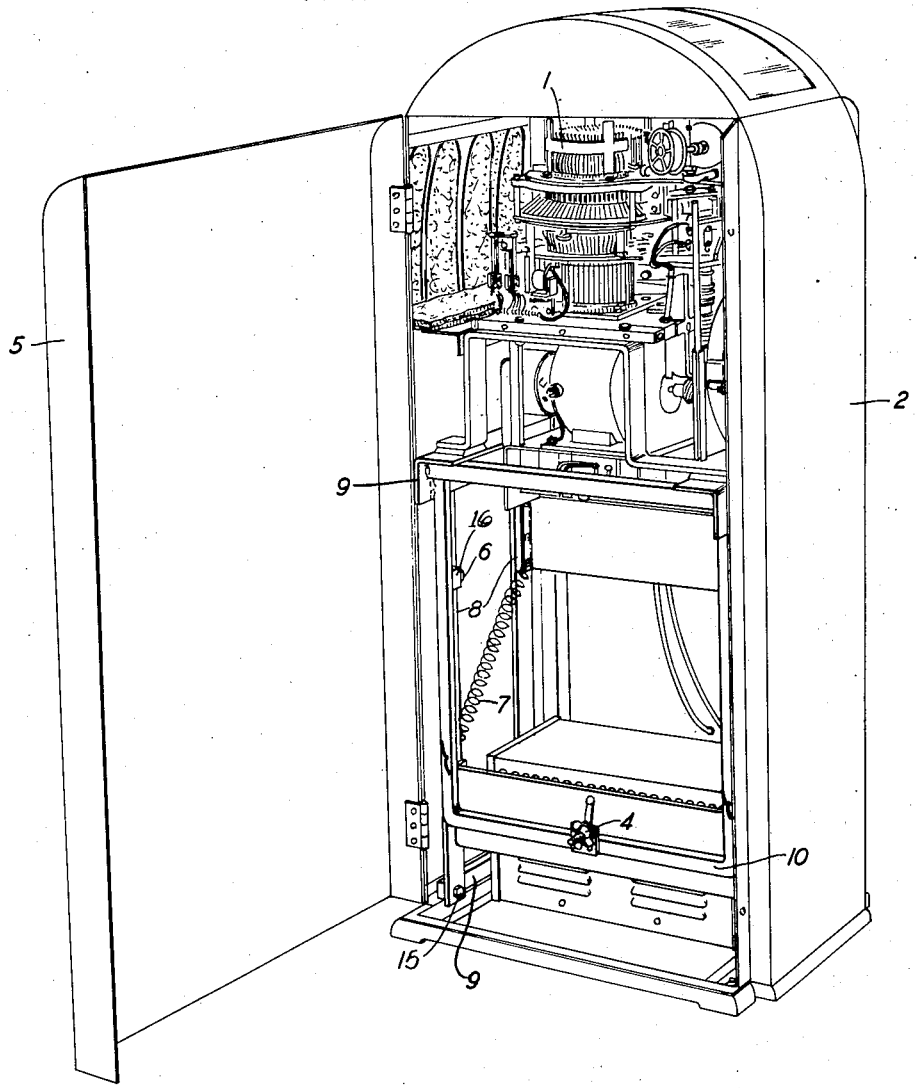
Fig. 1 illustrates the improved stand in its operating position and supporting a teletypewriter inside a cabinet comparable to the cabinet shown in Patent D-90,278 granted to me on July 11, 1933.

In Fig. 1, a teletypewriter 1, normally enclosed in a cabinet 2, is shown to be supported inside the housing of the cabinet 2 at a desired height by means of a stand comprising a framework which includes vertical supports 8—8, horizontal supports 9—9, and a base 10; the framework has its lower part attached to the housing of the cabinet 2 by pivotal connections 15—15 and its upper part attached to the stand by pivotal connections 15—15. As can be seen from the drawing, a portion of the stand's framework is constructed along the lines of a flexible parallelogram; that is, the vertical supports 8—8 (Fig. 2) of the stand form the sides of a parallelogram while the horizontal supports 9—9 (Fig. 2) form the ends of a parallelogram. Since the vertical supports 8—8 are pivotally connected to both the upper and the lower horizontal supports 9—9 by pivotal connections 15—15, they can either form flexible parallelograms as is shown in Fig. 2, or rectangles (a special type of parallelogram) as is indicated in Fig. 1. This construction enables the stand to be readily shifted from its operating position, shown in Fig. 1, to its maintenance position, shown in Fig. 2, and vice versa. A clamp 4 is provided for holding the stand securely in its operating position.

Normally, the door 5 of the cabinet 2 instead of being open, as is shown in Fig. 1, is closed, as is shown in the drawings of my design patent referred to above. Therefore, when a maintenance man wishes to repair or adjust the teletypewriter 1, he first opens the door 5 to the cabinet 2. Then, he unfastens the clamp 4 thereby releasing the stand. Finally, he takes hold of the top front of the stand and manually pulls it outside the housing of the cabinet 2 and downward so that its base 10 rests on the surface of the floor upon which the cabinet 2 rests and thereby supports the stand while in its maintenance position.

The result of this procedure is shown in Fig. 2 wherein it can be seen that the teletypewriter 1 is now in a position convenient for the purpose of being repaired and adjusted. This position of the stand is known as its maintenance position.

To put the teletypewriter 1 back inside the cabinet 2, the maintenance man lifts up the top front of the stand and pushes it back inside the housing of the cabinet 2. Then, he fastens the clamp 4 thereby holding the stand securely in its operating position, and shuts the door 5 of the cabinet 2.

Set-screws 6—6, shown in Fig. 3, are provided for the purpose of stopping the stand when it reaches its vertical position, from being pushed too far back inside the cabinet 2. Since set-screws 6—6 can be screwed in and out of their supporting blocks 16—16, they can also be used to adjust the stopping point of the stand, thereby permitting, to a slight extent, the centering of the teletypewriter 1 in its cabinet 2.

Springs 7—7 are supplied in order to counteract the weight of the teletypewriter 1 as it moves down into its maintenance position. Consequently, movement of the stand and the teletypewriter 1 to the operating position is facilitated. Should the clamp 4 become disengaged, springs 7—7 would lessen the possibility of movement of the stand to the maintenance position, due to the weight of the teletypewriter, before the maintenance man is prepared for it.

The advantages of this improved stand are that it is neat, compact, strong, inexpensive to manufacture, and easy to operate.

What is claimed is:

A cabinet for normally enclosing a teletypewriter which must be kept in level positions, said cabinet comprising a housing, a two position stand for supporting the teletypewriter, said stand having an operating position for supporting the teletypewriter in a desired level position inside the housing of the cabinet during typing operations and a maintenance position for supporting the teletypewriter in a level position outside the housing convenient for the purpose of being repaired and adjusted, and holding means for holding the stand securely in its operating position, said holding means being capable of being released, said stand including a flexible parallelogram framework for guiding and facilitating the shifting of the stand from its operating position to its maintenance position and vice versa after the holding means has been released, said framework having a base for supporting the stand while in its maintenance position, and said framework having its lower part attached to the housing and its upper part attached to the stand.

EDWIN A. BESCHERER.